United States Patent
Shigeta

(10) Patent No.: US 8,245,931 B2
(45) Date of Patent: Aug. 21, 2012

(54) INFORMATION DISPLAY SYSTEM AND DOT PATTERN PRINTING SHEET USED FOR SAME

(75) Inventor: Tatsuo Shigeta, Chiba (JP)

(73) Assignee: Think Laboratory Co., Ltd, Chiba (JP)

( * ) Notice: Subject to any disclaimer, the term of this patent is extended or adjusted under 35 U.S.C. 154(b) by 0 days.

(21) Appl. No.: 13/057,402

(22) PCT Filed: Aug. 11, 2009

(86) PCT No.: PCT/JP2009/003846
§ 371 (c)(1),
(2), (4) Date: Feb. 3, 2011

(87) PCT Pub. No.: WO2010/018687
PCT Pub. Date: Feb. 18, 2010

(65) Prior Publication Data
US 2011/0132986 A1    Jun. 9, 2011

(30) Foreign Application Priority Data

Aug. 12, 2008   (JP) ................................ 2008-207925

(51) Int. Cl.
*G06K 7/14* (2006.01)
(52) U.S. Cl. ..................................................... 235/454
(58) Field of Classification Search ................... 235/454
See application file for complete search history.

(56) References Cited

U.S. PATENT DOCUMENTS

| | | | | |
|---|---|---|---|---|
| 5,741,381 | A * | 4/1998 | Dolence et al. | 156/64 |
| 2006/0154559 | A1 * | 7/2006 | Yoshida | 446/297 |
| 2007/0186791 | A1 * | 8/2007 | Kim et al. | 101/151 |
| 2009/0091530 | A1 | 4/2009 | Yoshida | |

FOREIGN PATENT DOCUMENTS

| | | |
|---|---|---|
| EP | 1 016 541 A2 | 7/2000 |
| JP | 3706385 B | 10/2005 |
| JP | 2005 304630 A | 11/2005 |
| JP | 2006-085498 A | 3/2006 |
| JP | 2006-190270 A | 7/2006 |
| JP | 4008952 B | 11/2007 |
| JP | 4088936 B | 11/2007 |
| JP | 2008-026958 A | 2/2008 |
| JP | 2008 152756 A | 7/2008 |

* cited by examiner

*Primary Examiner* — Kristy A Haupt
(74) *Attorney, Agent, or Firm* — McGlew and Tuttle, P.C.

(57) ABSTRACT

Provided are an information display system and a dot pattern printing sheet used for the same, which are capable of easily displaying information only by reading a dot pattern, easy for update of the information, and excellent in durability and abrasion resistance to prevent deterioration of the dot pattern formed on a print surface. The information display system includes: a dot pattern printing sheet including a dot pattern having coordinate position code information, which is printed on an outer sheet thereof so as to be low in visibility and optically readable; optical reading means for optically reading the coordinate position code information; information transfer means for transferring the coordinate position code information read by the optical reading means to a server device; the server device for outputting associated information that is accumulated in advance in association with the coordinate position code information; and information display means for displaying the associated information output from the server device.

12 Claims, 8 Drawing Sheets

(a)

Front surface side (b)

Rear surface side (a)

(b)

INFORMATION DISPLAY SYSTEM AND DOT PATTERN PRINTING SHEET USED FOR SAME

TECHNICAL FIELD

The present invention relates to an information display system, in which information data on multimedia information such as a moving image is printed in an optically readable dot pattern, and a dot pattern printing sheet used for the same.

BACKGROUND ART

There has conventionally and often been conducted such an operation that an optically readable code containing information data is printed and optically read, to thereby display information.

There is an information display system using, as one kind of the optically readable code, a one-dimensional code (barcode) that is affixed to a price tag of a commercial product in advance and is read by an infrared scanner at the time of checkout, to thereby obtain information such as a price thereof.

There is also an information display system in which a two-dimensional matrix code containing specific uniform resource locator (URL) information is printed in advance and is read by a camera of a mobile phone having a code reading function, to thereby guide a user to the link destination URL via the Internet.

Further, there is proposed an icon formed on a medium (Patent Document 1, Abstract). In a system using this icon, in order to recognize various kinds of multimedia information, dots are generated based on a dot code generating algorithm, a dot pattern portion is formed on a medium such as a printed material so that the dots are arrayed following a predetermined rule, the medium is read by reading means to obtain image data, the image data is converted into code data, multimedia information associated with the code data is read from storage means, and the multimedia information is reproduced.

PRIOR ART DOCUMENTS

Patent Documents
Patent Document 1: JP 2006-190270 A
Patent Document 2: JP 4088936 B
Patent Document 3: JP 3706385 B
Patent Document 4: JP 4008952 B

SUMMARY OF INVENTION

Problems to be Solved by the Invention

The inventor of the present invention has eagerly studied to find that a dot pattern formed on a print surface can be prevented from its deterioration by printing a high-definition dot pattern on a rear side of an outer sheet through gravure printing in an inverted manner with respect to a front surface side, and reading the dot pattern from the front surface side, which has brought the present invention to completion.

The present invention has an object to provide an information display system and a dot pattern printing sheet used for the same, which are capable of easily displaying information only by reading a dot pattern, easy for update of the information, and excellent in durability and abrasion resistance to prevent deterioration of the dot pattern formed on a print surface.

Means for Solving the Problems

In order to achieve the above-mentioned object, the present invention provides an information display system including: a dot pattern printing sheet including a dot pattern having coordinate position code information, which is printed on an outer sheet thereof so as to be low in visibility and optically readable; optical reading means for optically reading the coordinate position code information; information transfer means for transferring the coordinate position code information read by the optical reading means to a server device; the server device for outputting associated information that is accumulated in advance in association with the coordinate position code information; and information display means for displaying the associated information output from the server device, in which the dot pattern is printed in a state in which a coordinate system of the dot pattern is inverted with respect to a coordinate system viewed from a front surface side of the outer sheet, in order that the dot pattern is printed on a rear surface of the outer sheet through gravure printing, and that the dot pattern is read by the optical reading means through the outer sheet from the front surface side of the outer sheet.

The outer sheet is preferably a transparent sheet. Further, the outer sheet is preferably a flexible sheet such as a thin plastic film, and particularly preferably, a transparent, flexible sheet.

In order to print the dot pattern having the coordinate position code information so that the dot pattern is low in visibility and optically readable, a dot pattern described in Patent Document 3 may be employed. Further, when the dot pattern is printed by using infrared absorbing ink or ultraviolet absorbing ink that absorbs only an infrared ray or an ultraviolet ray, a dot pattern invisible to a person is obtained. Further, in a case of using ink containing carbon black, a fine dot pattern is created to become low in visibility.

As described above, the dot pattern is printed so as to be low in visibility and optically readable, and accordingly such an advantage is produced that only necessary letters and pictures can be printed on the print surface because the dot pattern is invisible to a person.

The ink used for printing the dot pattern is preferably infrared absorbing ink or ultraviolet absorbing ink. The infrared absorbing ink herein refers to ink that absorbs an infrared ray instead of visible light, while the ultraviolet absorbing ink herein refers to ink that absorbs an ultraviolet ray instead of visible light. As an example of those kinds of ink, ink disclosed in Patent Document 2 may be employed. Further, ink containing carbon black may preferably be employed.

The outer sheet is preferably a transparent, flexible sheet such as a flexible packaging material using a thin plastic film. If necessary, printing using white ink may be performed on the dot pattern print surface to provide a white ink layer, and an inner sheet may further be provided thereon. The above-mentioned process is performed because in a case where the dot pattern printing sheet is applied to a food packaging film, for example, only the inner sheet is brought into contact with a food product. The inner sheet is preferably a transparent sheet. Further, the inner sheet is preferably a flexible sheet such as a flexible packaging material using a thin plastic film, and particularly preferably, a transparent, flexible sheet. As the inner sheet, a sheet formed of the same material as that of the outer sheet is applicable.

To obtain the dot pattern, a dot pattern technique described in Patent Document 3 is applicable, in which a predetermined number of information pieces on fine dot formation positions are combined as a minimum code. The dot pattern is printed through gravure printing, and accordingly such an advantage is produced that a high-definition dot pattern can be obtained and the dot pattern can be printed even on a flexible, transparent film.

Further, the optical reading means to be used may be optical reading means sensitive to an infrared ray or an ultraviolet ray, and a dot pattern reading unit described in Patent Document 4 may be employed.

The gravure plate used for the gravure printing is preferably produced through a laser platemaking method because a high-definition, fine dot pattern can be obtained through the printing.

Further, the dot pattern printing sheet may be a food packaging film for packaging a food product, and the server device may accumulate in advance information on an origin of the food product in association with the coordinate position code information, to thereby display the information on the origin of the food product on the information display means.

Further, the present invention provides a dot pattern printing sheet used for the information display system, including: an outer sheet; and a dot pattern having coordinate position code information, which is printed on the outer sheet so as to be low in visibility and optically readable, in which the dot pattern is printed in a state in which a coordinate system of the dot pattern is inverted with respect to a coordinate system viewed from a front surface side of the outer sheet, in order that the dot pattern is printed on a rear surface of the outer sheet through gravure printing, and that the dot pattern is read by the optical reading means through the outer sheet from the front surface side of the outer sheet.

Effects of the Invention

The present invention produces such a noticeable effect as to provide the information display system and the dot pattern printing sheet used for the same, which are capable of easily displaying information only by reading the dot pattern, easy for update of the information, and excellent in durability and abrasion resistance to prevent deterioration of the dot pattern formed on the print surface.

DESCRIPTION OF EMBODIMENT

An embodiment of the present invention is described below, but the embodiment is merely described as an example, and naturally, various modifications may therefore be made without departing from the technical idea of the present invention.

Figure 1:
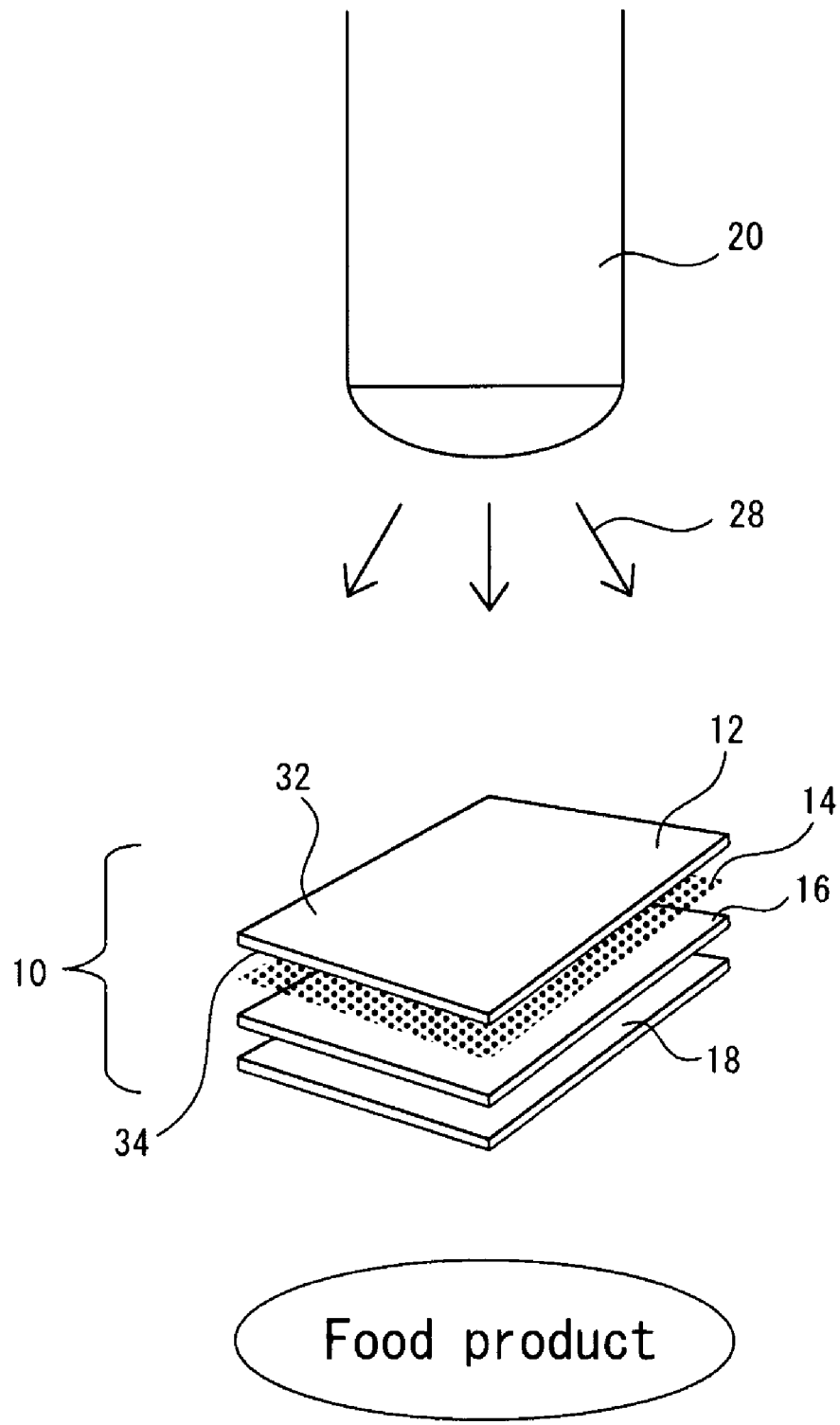
FIG. 1 is a perspective view illustrating a dot pattern printing sheet according to the present invention.

In FIG. 1, reference numeral 10 denotes a dot pattern printing sheet. The dot pattern printing sheet 10 includes a transparent, flexible outer sheet 12, a dot pattern 14 having coordinate position code information, which is printed on the outer sheet 12 through gravure printing using ink containing carbon black so as to be low in visibility and optically readable, a white ink layer 16 provided on a print surface of the dot pattern 14, and a transparent, flexible inner sheet 18 provided thereon.

Figure 6:
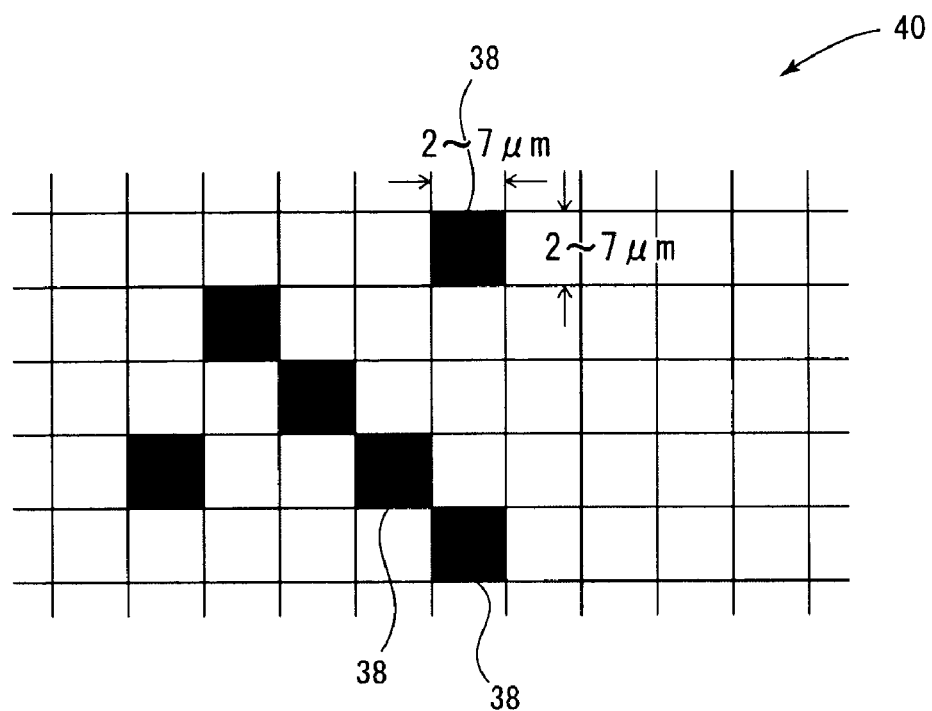
FIG. 6 is a schematic explanatory diagram of a gravure plate obtained through laser platemaking.
Figure 7:
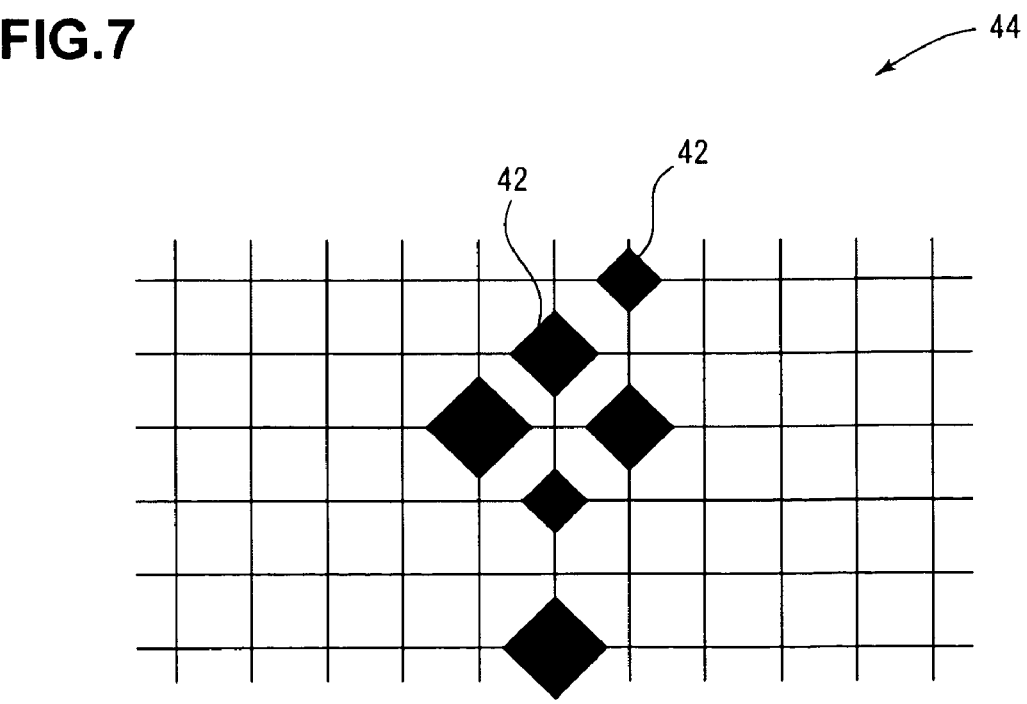
FIG. 7 is a schematic explanatory diagram of a gravure plate obtained through electronic engraving.

There are two kinds of method for producing a gravure plate used for the gravure printing. That is, a laser platemaking method and an electronic engraving method may be used. Obtained through the laser platemaking method may be a gravure plate 40 in which gravure cells 38 are formed at a pitch of 2 to 7 μm square (FIG. 6). Obtained through the electronic engraving method is a gravure plate 44 in which gravure cells 42 are formed at a pitch normally defined by 175 lines/inch (FIG. 7). In view of the above, the gravure plate 40 obtained through the laser platemaking method is more feasible for printing the dot pattern 14 than the gravure plate 44 obtained through the electronic engraving method. In the embodiment of the present invention, a gravure plate obtained through the laser platemaking using FX80 manufactured by Think Laboratory Co., Ltd. is employed.

In the example of the figure, the dot pattern printing sheet 10 is used as a food packaging film. In the example of the figure, a food product is positioned on a side of contact with the inner sheet 18.

Note that, in the case of the food packaging film, in general, such an operation is often conducted that a pigmented layer and a white ink layer (underlayer) are provided on a rear surface of an outer sheet, which is the outermost layer, and an inner sheet different from the outer sheet is further laminated thereon. This operation is conducted so as to laminate the innermost layer to be brought into contact with the food product or the like.

To obtain the dot pattern 14 having the coordinate position code information, the dot pattern technique described in Patent document 3 is applicable, in which a predetermined number of information pieces on fine dot formation positions are combined as a minimum code.

Figure 2:
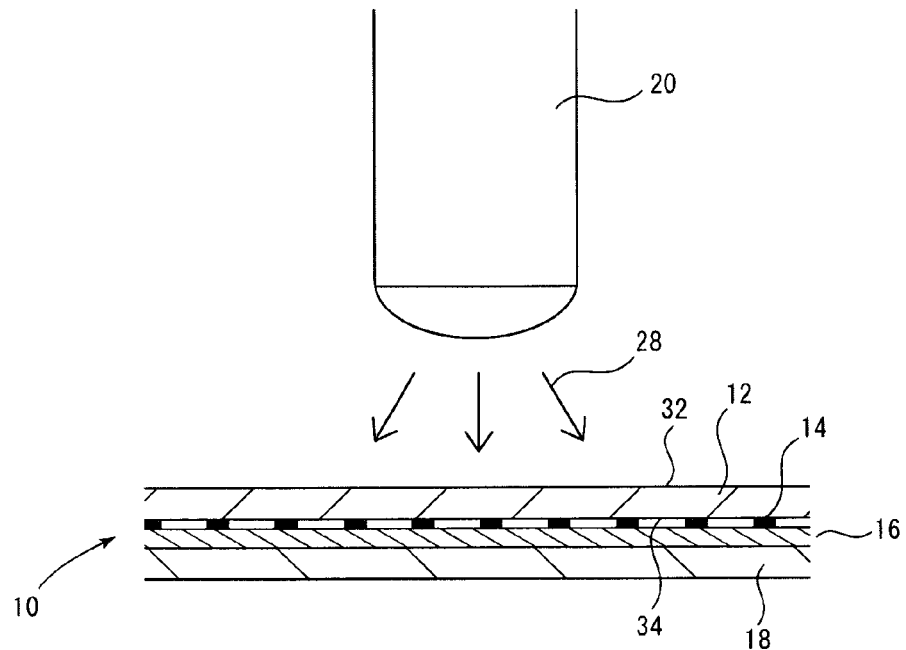
FIG. 2 is a cross-sectional view of FIG. 1.
Figure 3:
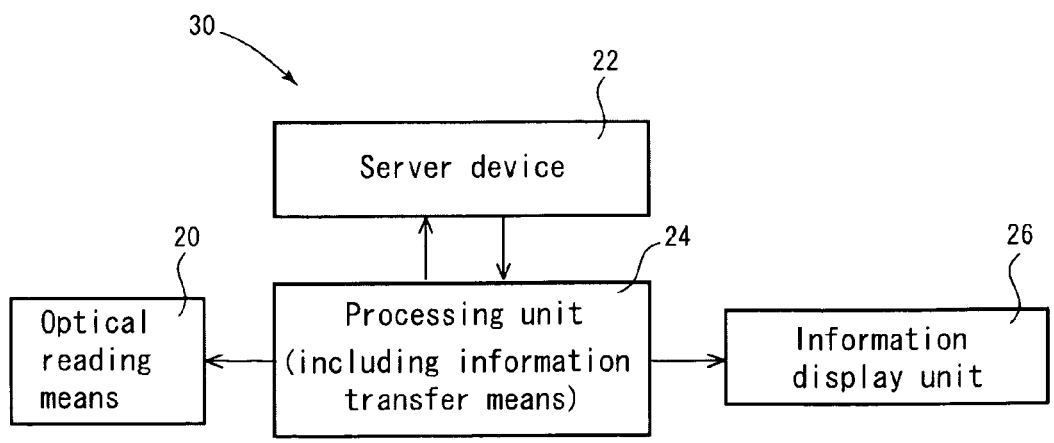
FIG. 3 is a block diagram illustrating a configuration of an information display system according to the present invention.

The dot pattern 14 is optically read by optical reading means 20 through the outer sheet 12 (FIG. 1 and FIG. 2). As the optical reading means 20, the dot pattern reading unit described in Patent document 4 is applicable. In the example of the figure, the dot pattern reading unit described in Patent document 4 using an infrared LED is employed. Reference numeral 28 denotes infrared rays. Note that, in a case of printing the dot pattern 14 using ultraviolet absorbing ink, optical reading means 20 sensitive to an ultraviolet ray is employed.

An information display system 30 according to the present invention includes the outer sheet 12 on which the dot pattern 14 having the coordinate position code information is printed so as to be low in visibility and optically readable, a processing unit 24 (in the example of the figure, including information transfer means) for transferring the coordinate position code information read by the optical reading means 20 to a server device 22, the server device 22 for outputting associated information that is accumulated in advance in association with the coordinate position code information, and an information display unit 26, which is information display means for displaying information from the server device 22.

In the example of the figure, the optical reading means 20 is an infrared scanner, the processing unit 24 is a personal computer, and the information display unit 26 is a PC display device.

The server device 22 is connected to the Internet, which is a communication network. The server device 22 has WWW server software (http daemon program) operating thereon, and includes other necessary hardware (not shown) as exemplified by a storage medium such as a hard disk and a network communication device such as a modem. As the processing unit 24 that is a client terminal, a notebook PC, a desktop PC, a mobile phone, or the like is connected to the Internet, to thereby enable communications conforming to the TCP/IP protocol with the server device 22 due to a web browsing function (WWW browser). Note that, as the processing unit 24 that is the client terminal, any processing unit having the web browsing function (WWW browser) may be employed with no particular limitation on its manufacturer and model. Further, the number of the server devices 22 is not limited to one, and a plurality of server devices having the same function may be prepared.

Then, the dot pattern 14 is printed through gravure printing in a state in which a coordinate system of the dot pattern is inverted with respect to a coordinate system viewed from a front surface 32 side of the outer sheet 12, in order that the dot pattern 14 is printed on a rear surface 34 of the outer sheet 12 through gravure printing so as to be low in visibility and optically readable, and that the dot pattern 14 is read by the optical reading means 20 through the outer sheet 12 from the front surface 32 side of the outer sheet.

Figure 5:
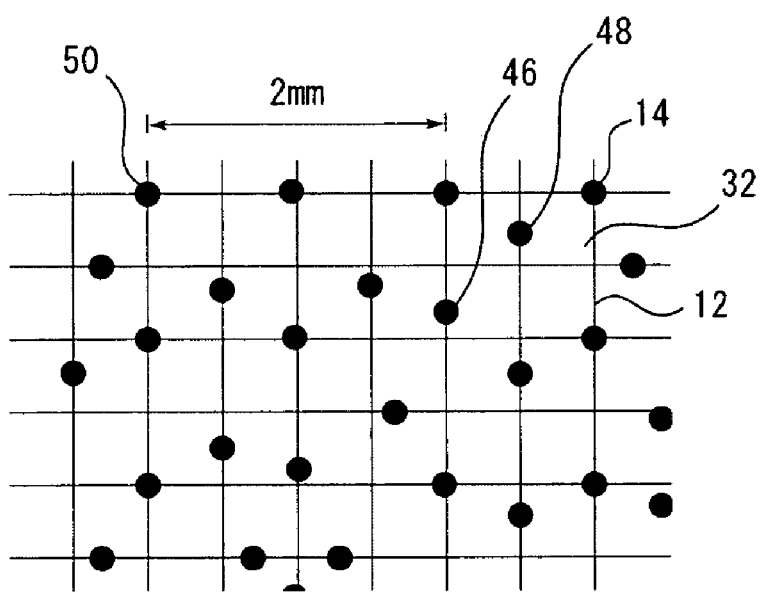
FIG. 5 illustrates an example of a dot pattern to be printed on the dot pattern printing sheet according to the present invention, in which the part (a) illustrates the dot pattern viewed from an optical reading surface side (front surface side) and the part (b) illustrates the dot pattern viewed from a dot pattern print surface (rear surface side).
Figure 5:
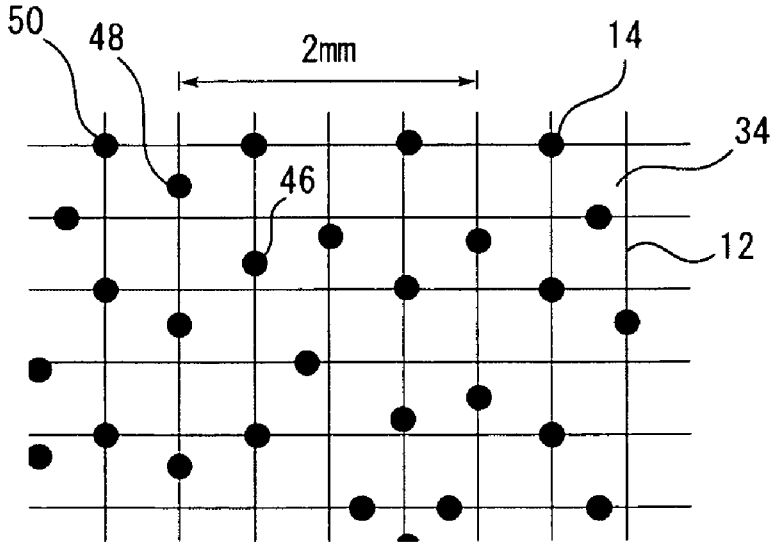

In order to realize the inversion, as illustrated in FIG. 5, for example, the dot pattern 14 may be printed so that the coordinate system of the dot pattern becomes a right-handed coordinate system while the coordinate system viewed from the front surface 32 side of the outer sheet 12 becomes a left-handed coordinate system. In other words, the dot pattern 14 may be printed so that both the coordinate systems have a mirror image relation. As described above, to obtain the dot pattern having predetermined code information, the dot pattern technique described in Patent Document 3 is applicable, in which a predetermined number of information pieces on fine dot formation positions are combined as a minimum code.

In the dot pattern technique described in Patent Document 3, as illustrated in FIG. 5, key dots 46, information dots 48, and grid dots 50 are arrayed following a predetermined rule. The predetermined rule is described in Patent Document 3, and therefore details thereof are omitted herein. In Patent Document 3, as illustrated in FIG. 5, the 5×5 grid dots 50 are arranged as being centered on the key dots 46, and the information dots 48 are arranged around a virtual center point surrounded by the four grid dots 50, to thereby form a block of the dot pattern 14 representing information. Arbitrary numerical information is defined in this block. Then, the dot pattern 14 is read by the optical reading means 20 to extract the grid dots, then extract the key dots 46 from the fact that no dot is found at a position at which the grid dots are supposed to be arranged, and then extract the information dots 48. The information dots 48 are digitized to extract an information area and to numerically process the information. By the numerical information thus obtained, information and a program are output from the dot pattern 14.

The part (a) of FIG. 5 illustrates the dot pattern viewed from an optical reading surface side (front surface side of the outer sheet), and the part (b) of FIG. 5 illustrates the dot pattern viewed from a dot pattern print surface (rear surface side of the outer sheet).

Figure 8:
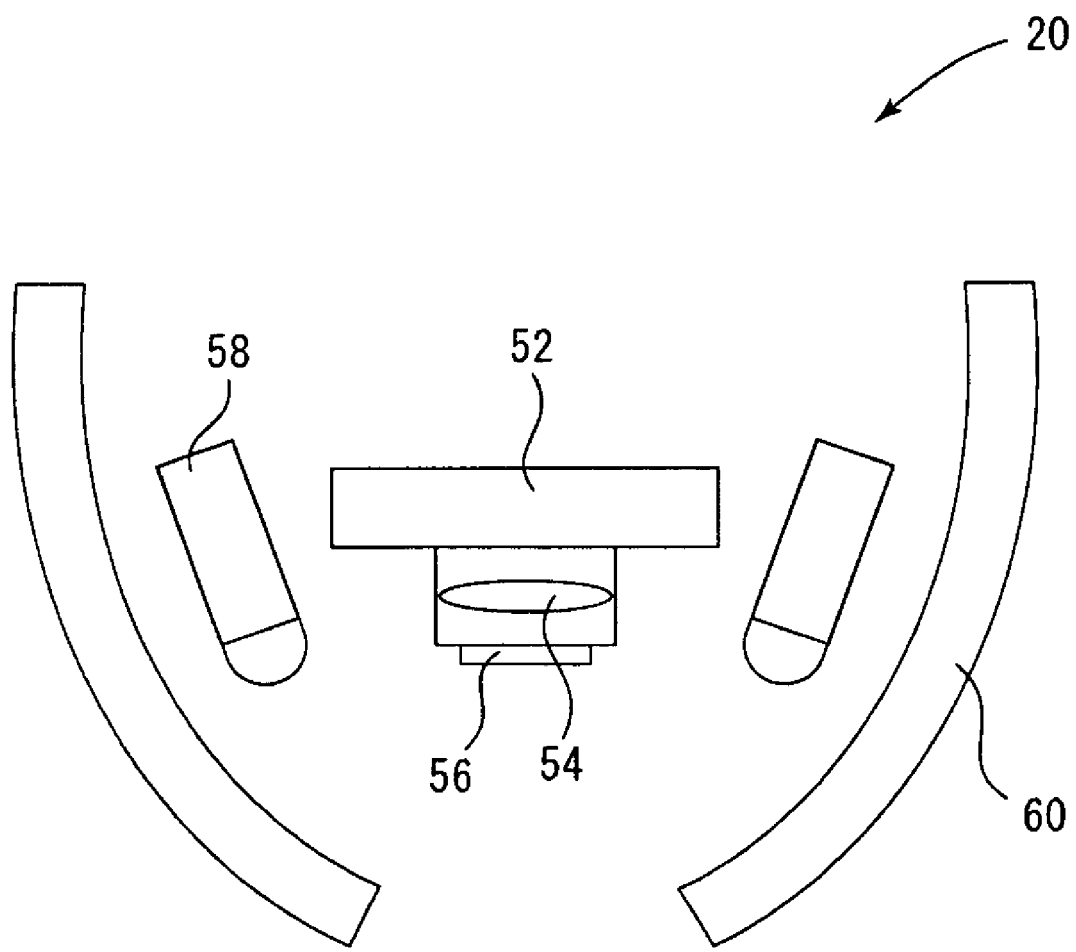
FIG. 8 is a schematic cross-sectional view illustrating one embodiment of optical reading means.

Next, referring to FIG. 8, description is given of an example of the optical reading means 20 which is applicable to the present invention. In FIG. 8, the optical reading means 20 includes a complementary metal oxide semiconductor (C-MOS) sensor 52, a lens 54, an infrared filter 56, and an infrared LED 58. Reference numeral 60 denotes a frame body. Further, the optical reading means 20 has a universal serial bus (USB) connector (not shown) attached thereto, with which the optical reading means 20 is connected to the personal computer 24 for its use.

Figure 4:
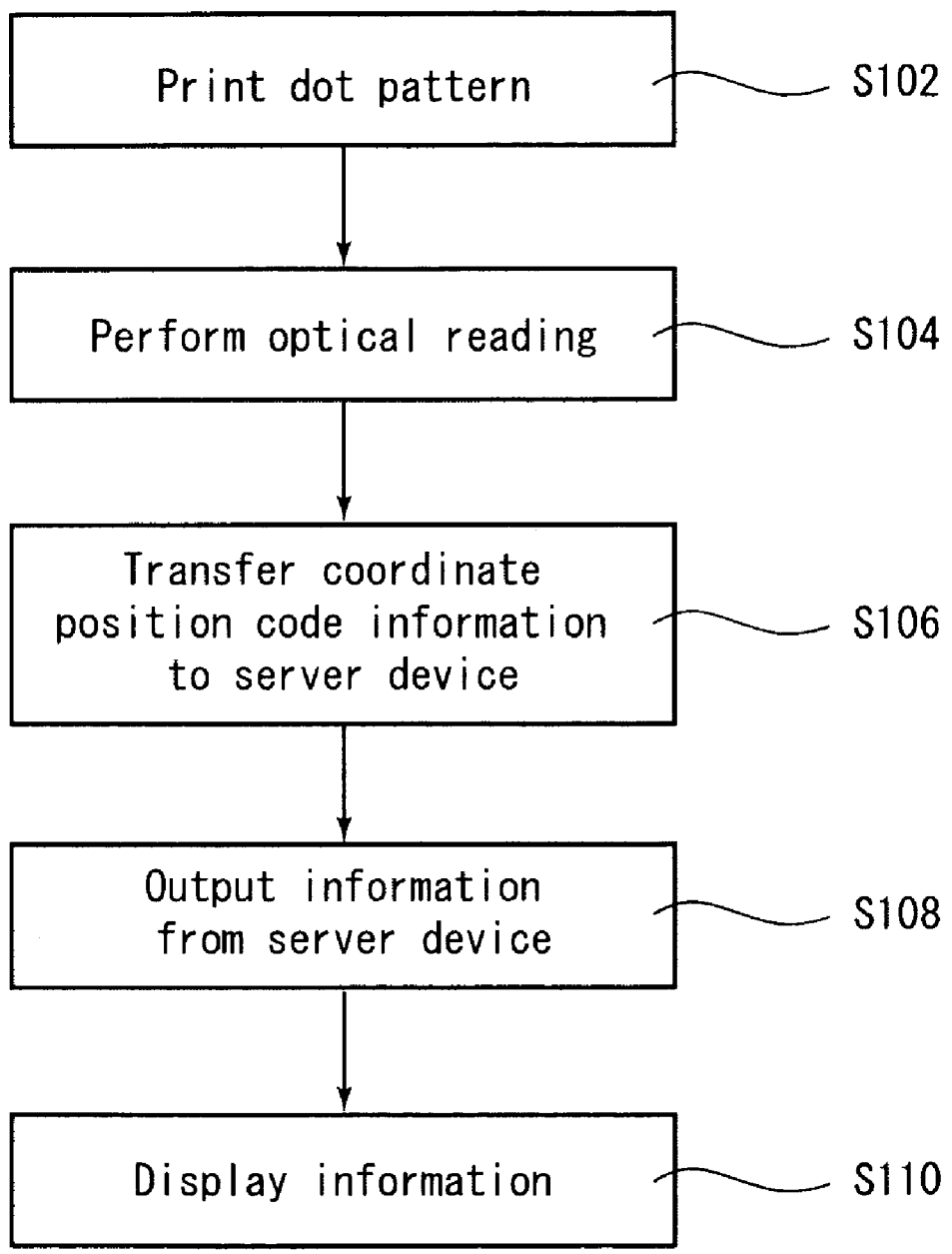
FIG. 4 is a flow chart illustrating a flow of processing performed in the information display system according to the present invention.

Next, referring to FIG. 4, description is given of a flow chart of the information display system 30 according to the present invention. First, the dot pattern 14 is printed to create the dot pattern printing sheet 10 (Step 102).

Subsequently, the dot pattern 14 is optically read by the optical reading means 20 (Step 104).

Subsequently, coordinate position code information of the dot pattern 14 is transferred to the server device 22 (Step 106).

Subsequently, the server device 22 outputs associated information that is accumulated in advance in association with the coordinate position code information (Step 108).

Subsequently, the output associated information is displayed on the display device 26 (Step 110).

Various kinds of information are conceivable as the associated information thus obtained, and the associated information is applicable for the purpose of adding to a paper medium by using a moving image or voice details of a picture book, English conversation, scenery on a trip, recipes for dishes, information on an origin of a food product, and a product catalog. Thus, the information display system according to the present invention is applicable for the purpose of adding to a paper medium by using a moving image or voice details of a picture book, English conversation, scenery on a trip, recipes for dishes, information on an origin of a food product, and a product catalog.

According to the present invention, information can easily be displayed only by reading the dot pattern. Further, a file accumulated in the server device 22 only needs to be updated to obtain the latest information, and hence the update is easy. Further, the dot pattern 14 is printed on the rear surface side of the outer sheet 12, and hence the dot pattern 14 is excellent in durability and abrasion resistance. Further, because the dot pattern 14 is printed through gravure printing, a high-definition dot pattern can be obtained and the dot pattern can be printed even on a flexible sheet such as a transparent film.

EXAMPLE 1

A moving image was created and saved in the server device 22 in the office as an MPEG-4 moving image file. Contents of the moving image were advertisement of frozen fried chicken, indication of a best before date thereof, and introduction of a recipe therefor, and the moving image was about five minutes long.

As the optical reading means 20, G-scanner manufactured by Gridmark Inc. was employed. The schematic structure thereof was the same as the one illustrated in FIG. 8. The optical reading means 20 was connected to a personal computer through USB connection.

Figure 9:
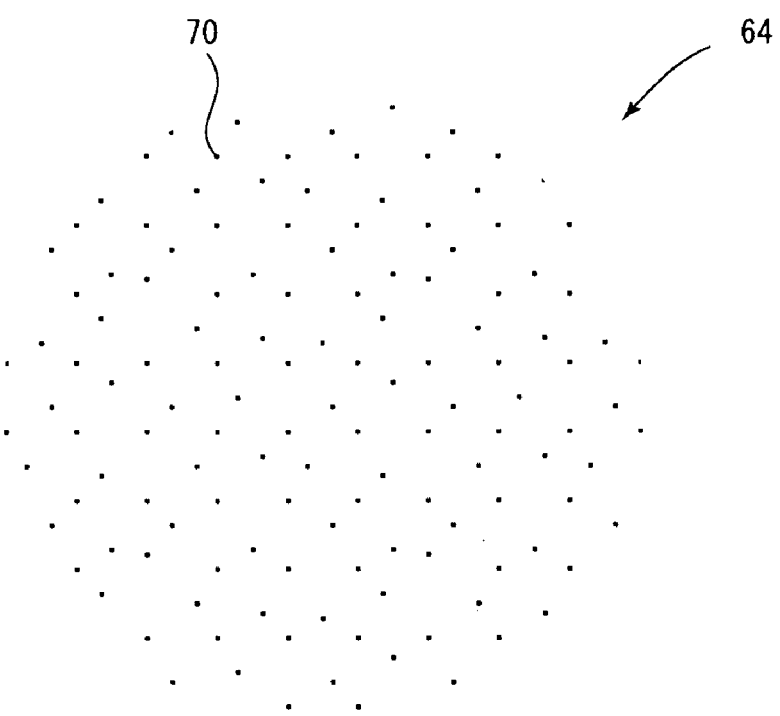
FIG. 9 illustrates a dot pattern of Example 1, in which the part (a) illustrates the dot pattern viewed from the optical reading surface side (front surface side) and the part (b) illustrates the dot pattern viewed from the dot pattern print surface (rear surface side).
Figure 9:
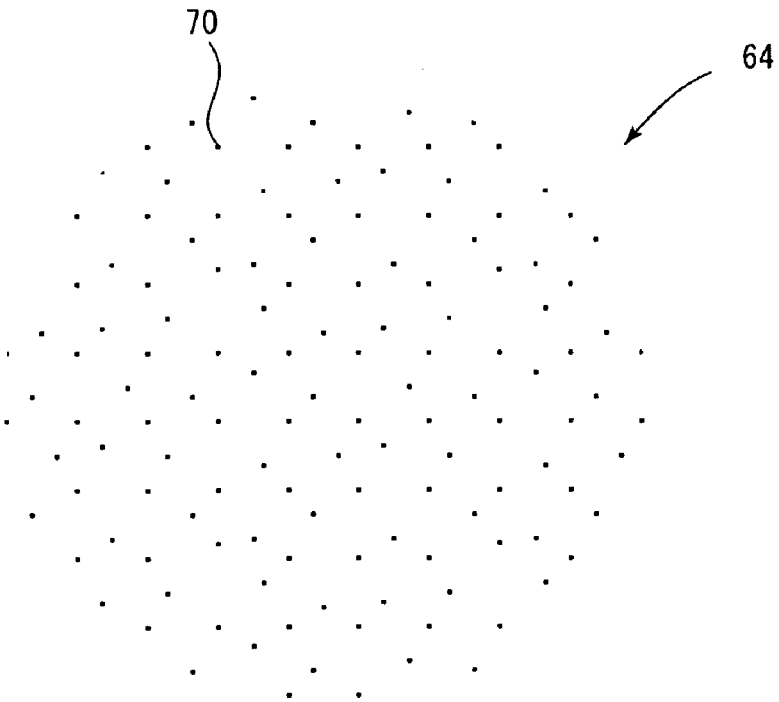

Laser platemaking was performed using a laser gravure platemaking machine manufactured by Think Laboratory Co., Ltd. (product name: FX80, a fully automatic laser gravure platemaking system), to thereby produce a gravure platemaking roll having gravure cells that were each 13 μm deep and 30 μm square. This gravure platemaking roll was employed and a printer manufactured by Nakajima Seiki Engineering Co., Ltd. (product name: PROTEC) was used for printing a dot pattern 64 illustrated in the part (b) of FIG. 9 on a rear surface of the outer sheet 12 of a food packaging film for frozen fried chicken at a printing speed of 200 m/min, to thereby create the dot pattern printing sheet 10. As the outer sheet 12 and the inner sheet 18 of the dot pattern printing sheet 10, a biaxially-oriented polypropylene film was employed. Further, white ink containing a titanium oxide was applied to form the white ink layer 16. The part (a) of FIG. 9 illustrates the dot pattern 64 viewed from the optical reading surface side (front surface side of the outer sheet), and the part (b) of FIG. 9 illustrates the dot pattern 64 viewed from the dot pattern print surface (rear surface side of the outer sheet). The dot pattern 64 was printed in a state in which the coordinate system of the dot pattern 64 illustrated in the part (b) of FIG. 9 was inverted with respect to the coordinate system viewed from the front surface side of the outer sheet 12 (the part (a) of FIG. 9). In other words, the dot pattern 64 was printed so that both the rear surface side (dot pattern print surface) of the outer sheet 12 and the front surface side of the outer sheet 12 had a mirror image relation. Note that, grid dots 70 of the dot pattern 64 in the part of FIG. 9 have the same intervals as the grid dots 50 in the part (a) of FIG. 5.

As the dot pattern 64, as illustrated in FIG. 5, key dots, information dots, and the grid dots 70 were arrayed following a predetermined rule. The grid dots 70 were set to have the same intervals as illustrated in FIG. 5. Commercially available gravure ink was used as the ink Specifically, oil-based surface printing ink (ink viscosity: 17 seconds) produced by T&K TOKA CO., LTD was used. The dot size of the printed dot pattern was 40 μm square. The dot pattern was low in visibility because the dot size was 40 μm square, but visible to the naked eye when observed carefully. In this example, the gravure platemaking roll having gravure cells that are each 13 μm deep and 30 μm square was used, but as described above, the gravure plate 40 in which the gravure cells 38 are formed at a pitch of 2 to 7 μm square may be produced through the laser platemaking method (see FIG. 6), and accordingly the dot pattern may be printed so as to have a smaller dot size.

The personal computer 24 has application software installed therein, and due to the application software, the coordinate position code information of the dot pattern 64 is associated with the moving image file in the server device 22.

Then, the optical reading means 20 was pressed against the front surface side of the food packaging film (dot pattern printing sheet 10) having the dot pattern 64 printed thereon (that is, front surface side of the outer sheet 12), to thereby optically read the dot pattern 64. Due to the application software installed in the personal computer 24, the moving image file associated with the coordinate position code information of the dot pattern 64 was reproduced on the PC display device 26 of the personal computer 24.

EXAMPLE 2

Figure 10:
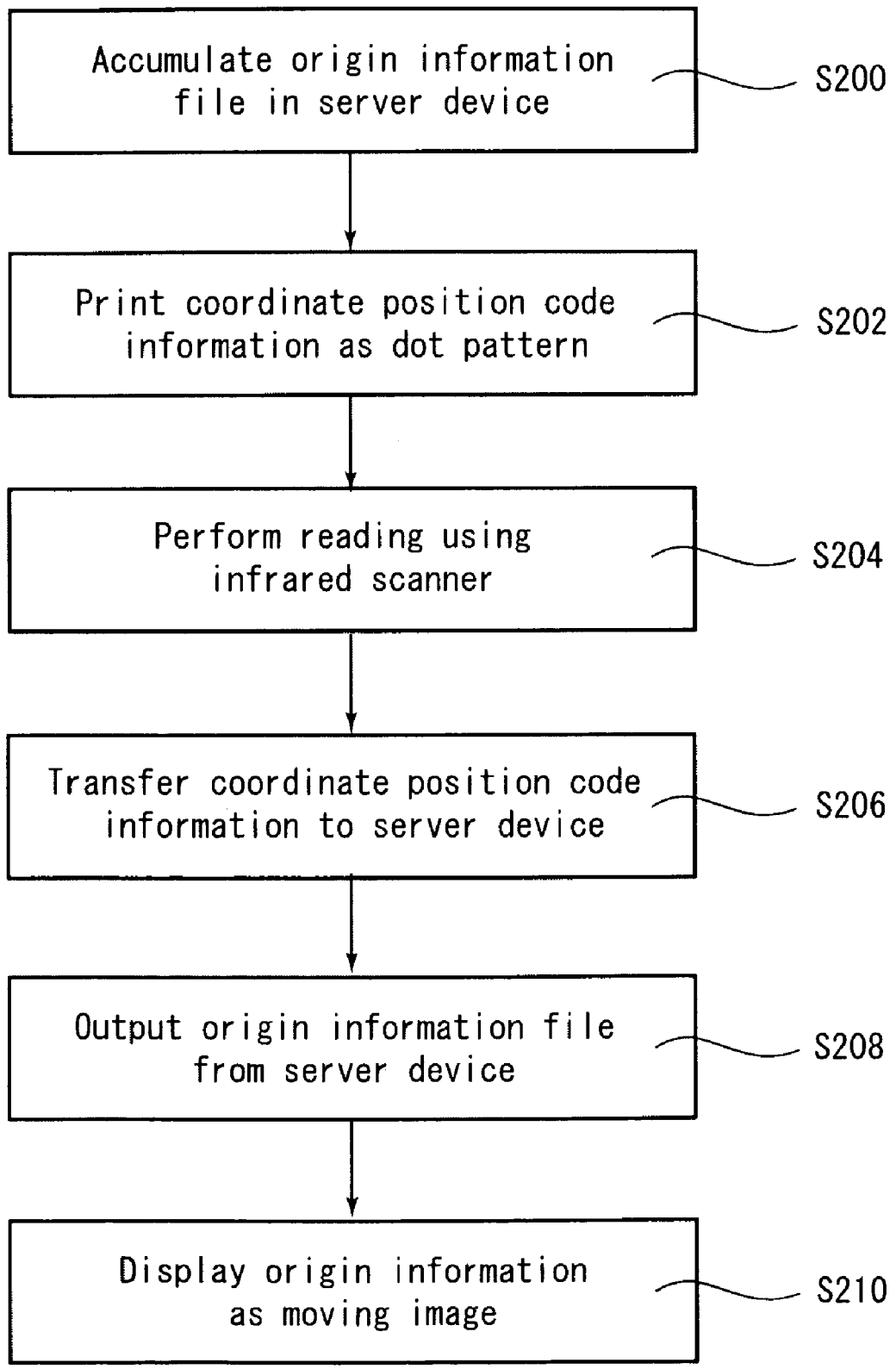
FIG. 10 is a flow chart in which the information display system according to the present invention is applied to indication of origin of a food product.

Next, referring to FIG. 10, description is given of an example in which the information display system according to the present invention is applied to indication of origin of a food product.

Described below is an example in which the information display system is applied to indication of origin of beef. First, information on the origin was obtained as an electronic file by a beef producer who recorded himself/herself and his/her beef cattle and input voice, and the obtained file was accumulated in the server device 22 (Step 200).

Then, the beef was packaged with a food packaging film being the dot pattern printing sheet 10. Employed as the food packaging film was the one mentioned in Example 1. At this time, the dot pattern 14 was printed next to the word "beef" indicating the content through gravure printing under the same condition as that of Example 1. The dot pattern was printed by using infrared absorbing ink containing carbon black so as to be converted into coordinate position code information expressed by numerical values, to thereby create the dot pattern printing sheet 10 (Step 202). At this time, similarly to Example 1, the dot pattern 14 was printed on the rear surface side of the outer sheet 12 in a state in which the coordinate system of the dot pattern 14 was inverted with respect to the coordinate system viewed from the front surface side of the outer sheet 12. The beef was packaged with the dot pattern printing sheet 10 thus created.

Subsequently, an infrared scanner that was the optical reading means 20 was pressed against the front surface side of the outer sheet 12, to thereby optically read the dot pattern 14 (Step 204). The infrared scanner 20 was connected to the personal computer 24 (processing unit) through a universal serial bus (USB), and due to application software installed in the personal computer 24, the coordinate position code information of the dot pattern 14 was immediately transferred to the server device 22 via the Internet (Step 206). In other words, jump to the link destination server device 22 occurred.

Subsequently, the server device 22 output the associated information that was accumulated in advance in association with the coordinate position code information, that is, the origin information file recorded in advance (Step 208).

Subsequently, the output associated information was displayed on the display device 26 (information display means) (Step 210). In this manner, the information obtained by the beef producer who recorded himself/herself and his/her beef cattle and input voice was displayed as a moving image.

As described above, the information obtained by the beef producer who records himself/herself and his/her beef cattle and inputs voice is displayed as a moving image, and thus consumers can purchase the beef with no anxiety.

With this configuration, the origin information file in the server device 22 is kept updated to obtain the latest information, and accordingly such an advantage is also produced that consumers can always receive the latest information without newly printing the dot pattern.

Further, the dot pattern is printed through gravure printing, and accordingly such an advantage is produced that the high-definition dot pattern can be obtained and the dot pattern can be printed even on a flexible, transparent film.

Industrial Applicability

According to the present invention, information can easily be displayed only by reading the dot pattern, update of the information is easy, and the dot pattern is excellent in durability and abrasion resistance to prevent the deterioration of the dot pattern formed on the print surface. Further, various information such as the origin of a food product can be displayed as a moving image.

Description of Reference Symbols

10: a dot pattern printing sheet, 12: an outer sheet, 14, 64: dot patterns, 16: a white ink layer, 18: an inner sheet, 20: an optical reading means, 22: a server device, 24: a processing unit, 26: an information display means, 28: an infrared ray, 30: an information display system, 32: a front surface, 34: a rear surface, 38, 42: gravure cells, 40, 44: gravure plates, 46: a key dot, 48: an information dot, 50, 70: grid dots, 52: a C-MOS sensor, 54: a lens, 56: an infrared filter, 58: an infrared LED, 60: a frame body.

The invention claimed is:

1. An information display system, comprising:
   a dot pattern printing sheet comprising a dot pattern having coordinate position code information, which is printed on an outer sheet thereof so as to be low in visibility and optically readable, said printing sheet comprising a white layer and an inner sheet, said white layer being provided on a print surface of said dot pattern, said inner sheet being provided on said white layer;
   an optical reading means for optically reading the coordinate position code information;
   a server device;
   an information transfer means for transferring the coordinate position code information read by the optical reading means to said server device, said server device for outputting associated information that is accumulated in advance in association with the coordinate position code information; and
   an information display means for displaying the associated information output from the server device, wherein the dot pattern is printed in a state in which a coordinate system of the dot pattern is inverted with respect to a coordinate system viewed from a front surface side of the outer sheet such that the dot pattern is printed on a rear surface of the outer sheet through gravure printing, and the dot pattern is read by the optical reading means through the outer sheet from the front surface side of the outer sheet.

2. An information display system according to claim 1, wherein a gravure plate used for the gravure printing is produced through a laser platemaking method.

3. An information display system according to claim 1, wherein the outer sheet comprises a transparent, flexible sheet.

4. An information display system according to claim 1, wherein:
   the dot pattern printing sheet comprises a food packaging film for packaging a food product, said inner sheet being applied to said food packaging film; and
   the server device accumulates in advance information on an origin of the food product in association with the coordinate position code information, to thereby display the information on the origin of the food product on the information display means.

5. A dot pattern printing sheet used for an information display system, the dot pattern printing sheet comprising:
   an outer sheet;
   a white layer comprising a front white layer surface and a rear white layer surface;
   an inner sheet; and
   a dot pattern having coordinate position code information, which is printed on the outer sheet so as to be low in visibility and optically readable, said front white layer engaging said dot pattern, said inner sheet engaging said rear white layer surface, wherein the dot pattern is printed in a state in which a coordinate system of the dot pattern is inverted with respect to a coordinate system viewed from a front surface side of the outer sheet such that the dot pattern is printed on a rear surface of the outer sheet through gravure printing, and the dot pattern is read by the optical reading means through the outer sheet from the front surface side of the outer sheet.

6. A dot pattern according to claim 5, wherein a gravure plate used for the gravure printing is produced through a laser platemaking method.

7. A dot pattern according to claim 5, wherein said outer sheet comprises a transparent, flexible sheet.

8. A dot pattern according to claim 5, further comprising:
   a food packaging film for packaging a food product, said inner sheet engaging said food packaging film.

9. An information display system, comprising:
   a dot pattern printing sheet comprising an optically readable dot pattern having coordinate position code information, an outer sheet, a white layer and an inner sheet, said dot pattern being printed on a rear surface of said outer sheet via gravure printing, wherein said dot pattern engages said rear surface of said outer sheet, said white layer engaging a print surface of said dot pattern, said inner sheet engaging said white layer, wherein said white layer is arranged between said inner sheet and said outer sheet;
   an optical reading means for optically reading the coordinate position code information;
   a server device;
   an information transfer means for transferring the coordinate position code information read by the optical reading means to said server device, said server device providing associated information as output, said associated information being accumulated in advance in association with the coordinate position code information; and
   an information display means for displaying the associated information output from the server device, said dot pattern comprising an outer sheet front side coordinate system and an outer sheet rear side coordinate system, said outer sheet front side coordinate system being inverted with respect to said outer sheet rear side coordinate system, said dot pattern being scanned by the optical reading means through the outer sheet from the front surface side of the outer sheet.

10. An information display system according to claim 9, wherein a gravure plate used for the gravure printing is produced through a laser platemaking method.

11. An information display system according to claim 9, wherein said outer sheet comprises a transparent, flexible sheet.

12. An information display system according to claim 9, wherein:
   said dot pattern printing sheet comprises a food packaging film for packaging a food product, said inner sheet engaging said food packaging film; and
   said server device accumulates in advance information on an origin of the food product in association with the coordinate position code information, to thereby display the information on the origin of the food product on the information display means, said dot pattern corresponding to information of said origin of the food product.

* * * * *